United States Patent [19]

Cooper et al.

[11] 4,003,867

[45] Jan. 18, 1977

[54] GLASS MOLD COATING DISPERSION OF ALUMINUM PHOSPHATE AND RESINOUS AGENT, PIGMENT, STABILIZER AND DISPERSING AGENTS

[75] Inventors: Arthur William Cooper; Thomas Edmund Rupp, both of Port Huron, Mich.

[73] Assignee: Acheson Industries, Inc., Port Huron, Mich.

[22] Filed: June 12, 1974

[21] Appl. No.: 478,587

[52] U.S. Cl. .............................. 260/17.5; 65/26; 106/38.22; 260/29.2 R; 260/29.2 M; 260/29.2 EP; 260/29.2 E; 260/29.4 R; 260/29.6 S; 260/29.6 MM; 260/37 SB; 260/37 EP; 260/39 SB; 260/42.13; 260/42.55

[51] Int. Cl.² ................ B28B 7/36; C03B 39/00

[58] Field of Search .............. 106/38.2; 260/29.4, 260/17.5, 29.2 R, 29.2 EP, 29.2 M, 29.2 E, 29.6 S

[56] References Cited

UNITED STATES PATENTS

| 2,072,212 | 3/1937 | Moosdorf et al. | 106/38.9 |
|---|---|---|---|
| 2,161,290 | 6/1939 | Grimm et al. | 106/286 |
| 2,522,548 | 9/1950 | Streicher | 106/38.9 |
| 2,610,957 | 9/1952 | Steinman et al. | 106/38.9 |
| 2,995,453 | 8/1961 | Noble et al. | 106/38.27 |
| 3,248,251 | 4/1966 | Allen | 106/286 |
| 3,304,257 | 2/1967 | Schanzer | 252/25 |
| 3,775,318 | 11/1973 | Lavik et al. | 252/12 |
| 3,783,013 | 1/1974 | Seeman | 427/318 |

*Primary Examiner*—Murray Tillman
*Assistant Examiner*—A. H. Koeckert
*Attorney, Agent, or Firm*—Harness, Dickey & Pierce

[57] ABSTRACT

A new coating composition, coated article and method are disclosed herein dealing with the preparation of coated surfaces which are useful, for example, in glass molding wherein a relatively lubricious, abrasion resistant surface is desired under conditions of high operating temperatures. The coating composition in its most basic aspect involves a dispersion of an aluminum phosphate and a very fine particle size pigment material together with other materials including novel dispersion stabilizing ingredients and a special water dispersible resinous film-modifying agent.

9 Claims, No Drawings

GLASS MOLD COATING DISPERSION OF ALUMINUM PHOSPHATE AND RESINOUS AGENT, PIGMENT, STABILIZER AND DISPERSING AGENTS

BACKGROUND OF THE INVENTION

This invention relates to a new coating composition, coated articles formed therewith, and the method of application of the coating to substrates. The coating composition herein is particularly useful for glass mold surfaces. Surfaces coated using the compositions of the invention may be used as molds for metal casting, as forging dies, etc. Coatings of this invention not only provide lubricating abrasion resistant surfaces, but they also protect the substrates from oxidation or decarburization on long exposure to high temperatures.

The state of the art is indicated by the following U.S. patents, the disclosures of which are incorporated herein by reference U.S. Pat. No's. Seeman 3,783,013; Schanzer, 3,304,257; Woodburn, 2,685,542; Noble, 2,995,453; Norton, 3,495,962; Gardner, 2,618,530; Garatt, et al, 2,587,722; Nagel, 2,564,308; Garratt, 2,246,463; Birchall, et al, 3,702,774; Strater, 3,510,347; Lavik, 3,775,318; Hermann, 3,467,596; Woodburn, 2,685,539; Dean, 2,426,988; and Felice, et al, 3,637,412.

There has been a long standing problem in manufacturing or molding glassware because the mold surfaces used for this purpose had to be swabbed at frequent intervals by the machine operator with a swabbing compound (i.e., a protective material which also functions as a parting agent or lubricant). In order to avoid this problem the industry has long sought a permanent or semipermanent glass mold coating for the surfaces which contact the hot molten glass. Such a coating was desired in order to avoid the necessity of numerous swabbing compound applications and to increase production rates for the glassware, while at the same time assisting in reducing the number of glassware pieces produced which were defective by reason of contamination, flaws or dimensional faults. Accordingly, a main object of the present invention is to provide a new coating composition which eliminates frequent swabbing of glass molds.

Another object of the present invention is to provide a new coating composition for surfaces which contact hot glass such that the surfaces require only minimal, if any, swabbing for periods of 8 to 24 hours and longer.

Another important object of this invention is to eliminate the air pollution normally encountered in factories where oily lubricants are swabbed or sprayed on molds, forming dies, or on billets. By eliminating the smoke and vapors generated from oily materials health and fire hazards and atmospheric pollution is substantially eliminated.

Another object of the present invention is to provide a new coating composition and method for coating substrate surfaces useful in connection with metal casting or forging, to provide lubricity, long wear, thermal stability and protection against oxidation.

Another object of the present invention is to provide a new coated article which is highly useful in molding, casting, and/or forming operations.

Another object of the present invention is to provide a new method of preparing a mold surface capable of abrasion resistant usage at high temperatures.

Still another object of the present invention is to prepare a new coating composition which is itself applied at high temperatures and which forms relatively lubricious high temperature resistant coatings.

Other objects, features and advantages of the present invention will become apparent from the subsequent description and the appended claims.

SUMMARY OF THE INVENTION

While the theory underlying the effectiveness of this invention is not completely understood and the invention itself is still being studied, suffice it to say that highly satisfactory results are obtained from the invention. For example it is possible using the coating compositions of this invention coated on glass mold surfaces to form glass jars continuously for about 96 hours without swabbing. The coating system of this invention once properly applied will burnish to a very fine smooth surface. The coating operates extremely well for long periods of time without swabbing and the coating does not appear to transfer to the glassware at any time. The coating also appears to be very refractory and functions as a coating having controlled thermal conductivity. Another important feature is that it has been found possible to use an organic resin film-modifying agent in the coating which significantly enhances the properties of the coating. Also the coating discovered and disclosed herein is an acid-stable small particle dispersion and it has been found possible to prepare coatings from this dispersion which give superior coverage and readily controlled thickness of the applied coating.

The present invention concerns compositions for use in forming coatings on surfaces such as those which contact hot glass in the manufacture of glassware, comprising in weight percent of the total solids, (a) about 5% to about 45% of finely particulated pigment from at least one of the group consisting of graphite, molybdenum disulfide, vermiculite, talc, glass, calcium fluoride, iron oxide, boron nitride, and other lubricating pigments, clay pigments, and refractory pigments, (b) about 1% to about 15% of a dispersing agent to provide for proper dispersion of the pigment in the composition, (c) about 20% to about 60% of an aluminum phosphate to serve as a binder material, (d) about 3% to about 20% of a dispersion stabilizing agent selected from at least one of the group consisting of the ammonium and the alkali metal monobasic, dibasic, or tribasic salts of phosphoric or phosphorus acids, and borate, tartrate, phthalate, acetate, or other similar buffering agents, (e) about 0% to about 50% of a water dispersible resin film-modifying agent for providing a fine smooth coating which is substantially carbonized after the coating is applied, (f) about 0% to about 20% of a nonionic emulsifying agent for said resin, said total solids being between about 2% and about 50% by weight of the composition, the balance being an aqueous solvent carrier.

In another aspect, briefly stated, the invention concerns a stable coating composition comprising in weight percent of the total solids, about 5% to about 45% of a finely particulated pigment operative as a parting agent, a lubricating agent, and for controlling heat conductivity in the coating, said pigment having a particle size wherein substantially all particles are under 20 microns in size, about 20% to about 60% of an aluminum phosphate, about 3% to about 20% of a dispersion stabilizing agent as defined herein, and a said total solids being between about 2% and about 50% by weight of the composition in an aqueous carrier.

From an article aspect, the invention concerns a new coated article used in molding and/or forming and which is resistant to high temperatures comprising a metal substrate coated with the composition of the invention.

From a method aspect of the invention involves a method of preparing a coated article such as a mold surface for abrasion resistant usage at high temperatures comprising the steps of, heating the substrate surface to a temperature between about 220° and about 1400° F., applying to said surface a coating composition comprising in weight percent of the total solids, about 5% to about 45% of a finely particulated pigment operative as a parting agent and for controlling heat conductivity in the coating, said pigment having a particle size wherein substantially all particles are under 20 microns in size, and about 20% to about 60% of an aluminum phosphate, and a balance of an aqueous carrier.

DESCRIPTION OF PREFERRED EMBODIMENTS

The pigment material for use in the invention should be present within the broad range of about 5% to about 45% by weight of the total solids in the coating composition. Preferably this percentage should be maintained within the range of about 13% to about 20% and best results are obtained with about 16% to about 18% by weight pigment. The optimum pigment level will be determined by the density of the pigment or pigment combination being used and the properties desired. The pigment appears to function as an agent which controls the heat conductivity of the coating. The pigment may also act as a parting agent or lubricating agent in the coating. Particularly suitable materials which can be used for the pigment are finely divided graphite, molybdenum disulfide, mica, vermiculite, talc, glass particles, boron nitride, calcium fluoride, iron oxide, and other refractory pigments, clay pigments, and high temperature resistant lubricating pigments.

The particle size of the pigment material should be maintained such that substantially all of the pigment particles are under 20 microns in size. Preferably substantially all of the pigment particles should be under 10 microns size and even better results are obtained through the use of a pigment particle size wherein substantially all of the particles are under 5 microns size. The best or optimum results have been obtained through the use of a pigment system wherein the pigment particles have an average particle size under 1 micron.

The dispersing agent for the pigment should generally be present within the composition in the broad range of about 1% to about 15% by weight of the total solids in the coating composition. Even higher amounts may in some instances be present, however, the higher amounts appear to produce negligible additional benefit. Preferably the dispersing agent for the pigment should be present within the range of about 3% to about 6% by weight and best results are obtained using a dispersing agent within the range of about 4% to about 5% by weight of the total solids. The function of the dispersing agent is to act as a surfactant which will properly disperse the pigment in the coating composition and preferably this dispersing agent should be an anionic sulfonate surfactant of the nonfoaming type. Commercially available dispersing agents for this purpose include: sodium salts of sulfonated naphthalene formaldehyde condensates, potassium alkyl naphthalene sulfonates; ammonium lignin sulfonate; and, sodium salts of a partial lignin sulfonate.

The dispersion stabilizing agent which appears to act as a buffering agent to maintain a stable dispersion in the presence of the aluminum phosphate acidic constituent of the coating composition should preferably be present within the broad range of about 3% to about 20% by weight of the total solids. Even higher amounts may in some instances be present, however, the higher amounts appear to produce negligible additional benefit. Preferably this stabilizing agent should be present within the range of about 7% to about 11% with best results being obtained through inclusion of the stabilizing agent within the range of about 9% to about 10% by weight of the total solids. This stabilizing agent or buffering agent may be selected from a number of different materials such as ammonium or alkali metal monobasic, dibasic, or tribasic salts of phosphoric or phosphorus acids, borate buffering agents, phthalate buffering agents, tartrate buffering agents, and various acetate buffering agents or other buffering agents.

The aluminum phosphate used in the composition should generally be present within the broad range of about 20% to about 60% by weight of the total solids. Preferably the aluminum phosphate should be present within the range of about 30% to about 45% and best results have been obtained within the range of about 38% to about 42% by weight of the total solids. The aluminum phosphate appears to contribute in a major degree as the binder in the applied coating. The preferred material for use in the invention is colloidal monoaluminum phosphate. Monoaluminum phosphate in aqueous solution is commercially available and it is highly acidic having a pH of about 1. Other forms of aluminum phosphate may be prepared by known chemical techniques.

The water dispersible resin film-modifying agent used in the composition should broadly be present within the range of about 0% up to about 50% by weight of the total solids. Even higher amounts may in some instances be present, however, the higher amounts appear to produce negligible additional benefit. Usually this material is present at a minimum of about 1% and preferably it is within the range of about 15% to about 38% by weight. Best results appear to be obtained when the resin is present within the range of about 22% to about 26% by weight of the total solids. The function of this resinous material is to act as a film-modifying agent which alters crystal growth and provides for finer, smoother coatings. It also appears to be thermally degraded or carbonized during or after the high temperature application of the coating. Particularly suitable resins are characterized by ability to form fine and acid stable emulsions in aqueous systems, and specifically by their ability to modify the character of the coatings of this invention. Among these resins are melamine resins such as methoxylated melamine resin, petroleum hydrocarbon resins, silicone resins such as silicone fatty acid adducts, certain epoxy resins, acrylic resins and polyester resins. Exemplary results have been obtained using methoxylated melamine resin.

The emulsifying agent or wetting agent for the resin should generally be present within the broad range of about 0% to about 20% by weight of total solids in the composition. Even higher amounts may in some instances be present, however, the higher amounts appear to produce neglibible additional benefit. Usually at least a minimum of about ½% of agent is used and preferably the agent should be present within the range of about 3% to about 12% by weight. Best results have been obtained within the range of about 4% to about 6% by weight of the total solids. The function of the emulsifying agent is to emulsify or disperse the resin into the aqueous coating composition and this emulsifying agent should preferably be a nonionic emulsifying agent for the resin. Numerous nonionic surfactants or emulsifying agents may be used for this purpose, with particularly suitable emulsifying agents being the nonyl or the iso-octyl phenyl polyalkoxy alcohols. The carrier or solvent system which forms the fluid carrier for the coating composition is essentially water in that the composition is formulated in an aqueous system. However, minor amounts of other water miscible organic solvents can be included as a part of the carrier or solvent system.

The total solids or total amount of active ingredients present in the coating composition should broadly be within the range of about 2% to about 50% by weight of the coating composition. Preferably the total solids should be maintained within the range of about 6% to about 40% by weight and best results appear to be obtained using a coating containing about 8% to about 35% by weight of total solids.

The substrate temperature for application of the coating composition herein should be broadly within the range of about 220° to about 1400° F. and preferably within the range of about 300° to about 700° F. It is remarkable, however, to form tenacious, lubricating, oxidation resistant coatings by spraying aqueous dispersions on surfaces as hot as 1400° F. Best results have been obtained by spraying the coating composition on the substrate surface with the surface of the substrate being maintained at a temperature within the range of about 500° to about 600° F. The coating may be applied by different techniques, for example, by spraying, brushing, dipping or the like, within limits imposed by substrate temperature and configuration.

The thickness of the applied coating may be as high as 10–15 mils and higher for specially desired high thickness coatings. Preferably, however, the coating should be applied at a thickness of about 1 to 10 mils and best results are obtained when the coating is applied at a thickness of about 2 to about 5 mils.

In order to further illustrate the invention, the following examples are provided. It is to be understood that the examples are included for illustrative purposes and are not intended to be limiting of the scope of the invention as set forth in the subjoined claims.

EXAMPLE 1

A dispersion of fine electric furnace graphite, substantially all finer than 1 micron, was prepared by grinding together in a pebble mill 13.6 parts graphite powder, 3.6 parts sodium salt of sulfonated naphthalene formaldehyde condensate, 7 parts of diammonium hydrogen phosphate, and 50 parts water. After grinding to achieve dispersion of the solid particles, 31 parts monoaluminum phosphate were added as a colloidal dispersion in 31 parts water, and grinding continued about 2 hours. A blend of 37.3 parts of methoxylated melamine resin and 7.5 parts of isooctyl phenyl polyethoxy ethanol was warmed to 100° F and mixed until clear. Fifty parts of cold water was added with stirring until uniform. The graphite dispersion and the resin dispersion were blended and diluted to 555 parts total weight. The product was sprayed on clean glass forming neck rings used to form glass baby food jars, after preheating the clean metal parts to 500° F. Coating thickness was about 0.006 in. The coated parts were baked at 600° F for one-half hour. Satisfactory clean ware was produced for 96 hours without recoating the neck rings. Swabbing was not required.

EXAMPLE 2

A dispersion of the fine electric furance graphite, substantially all finer than 5 microns, was prepared by grinding together in a pebble mill 20 parts graphite powder, 5.2 parts sodium salt of sulfonated naphthalene formaldehyde condensate, 10.4 parts of ammonium dihydrogen phosphate and 80 parts of water. After a sufficient grinding period to achieve dispersion of the graphite, 46 parts of monoaluminum phosphate as a colloidal dispersion in 46 parts of water were added and grinding continued 2 hours. A blend of 15.6 parts of methoxy melamine resin and 3.1 parts of isooctyl phenyl polyethoxy ethanol was warmed to 100° F and mixed until clear. Twenty parts of water was added with stirring to form a uniform emulsion. The graphite dispersion and the resin dispersion were blended and diluted to 830 parts total weight. The products were sprayed on the glass contacting surfaces of a neck ring assembly and blank molds used in forming an 11-ounce ketchup bottle. The parts to be coated were cleaned and heated to 450° F before coating to a thickness of 0.010 inch on the neck rings and 0.004 inch on the blank molds. After coating the parts were baked at 600° F for 1 hour. Coated surfaces were burnished with steel wool prior to use. Using these molds parts clean bottles were produced immediately and the molds operated satisfactorily for six hours without swabbing or recoating.

EXAMPLE 3

A dispersion of fine electric furance graphite, substantially all finer than 5 microns, was prepared by grinding together in a pebble mill 17.7 parts graphite powder, 4.7 parts sodium salt of sulfonated naphthalene formaldehyde condensate, 9.3 parts of ammonium dihydrogen phosphate and 80 parts water. After a sufficient time to achieve dispersion of the solid, 39.9 parts monoaluminum phosphate as a colloidal dispersion in 39.9 parts of water were added and grinding continued about 2 hours. A blend of 23.7 parts methoxy melamine resin and 4.7 parts of isooctyl phenyl polyethoxy ethanol was warmed to 100° F and mixed until clear. Thirty parts of cold water was added with stirring until uniform. The graphite dispersion and the resin emulsion were blended and diluted to 1,000 parts total weight. The product was sprayed on clean glass forming blank molds, which had been preheated to 500° F, to a coating thickness of 0.003 inch, after which the molds were baked at 600° F for onehalf hour. A mold coated as described produced good quality baby food jars for 26 hours before failure. No dirty glassware was formed by contamination from the coating at any time. The hazards of swabbing, which forms smoke and odors and leads to fire hazards in the glass plant, were eliminated.

EXAMPLE 4

A dispersion of fine electric furance graphite, substantially all finer than 10 microns, was prepared by grinding together in a pebble mill 22 parts of graphite powder, 11 parts sodium salt of sulfonated naphthalene formaldehyde condensate, 5.7 parts of diammonium hydrogen phosphate, and 80 parts of water. After a sufficient grinding period to achieve dispersion of the graphite, 50 parts of monoaluminum phosphate as a colloidal dispersion in 50 parts of water were added and grinding continued two hours. A blend of 9.6 parts of methoxy melamine resin and two parts of iso-octyl phenyl polyethoxy ethanol was warmed to 100° F and mixed until clear. Ten parts of water was added with stirring to form a uniform emulsion. The graphite dispersion and the resin dispersion were blended and diluted to 500 parts total weight. This material was sprayed on the die in the hot chamber of a diecasting machine, which was at a temperature of 400° F. Immediately after coating, zinc diecastings were prepared. The parts showed excellent release and were uncontaminated after the first 2 parts, the formation of which served to dehydrate and cure the coating. It was necessary to re-coat the die every 30 cycles. This was a substantial improvement over the conventional practice of spraying lubricant after each cycle by elimination of smoke and odor and increasing the production rate.

EXAMPLE 5

A dispersion of fine graphite powder, substantially all finer than 10 microns, was prepared by grinding together in a pebble mill 30 parts of graphite powder, 10.6 parts of sodium salt of a partial lignin sulfonate, 10 parts of ammonium dihydrogen phosphate, and 100 parts water, for a time sufficient to achieve dispersion of the solid. A dispersion of aluminum phosphate was prepared by heating together at 250° F for 5 minutes 3.4 parts of powdered aluminum oxide and 20 parts of syrupy phosphoric acid. This slurry was then blended with 20 parts of water and added to the contents of the pebble mill, followed by a 2-hour additional grinding period. 5.4 parts of methoxylated melamine resin was heated with 1.1 parts of iso-octyl phenyl polyethoxy ethanol, and the mixture blended until uniform. Twenty parts of water was added and stirring to form a uniform emulsion. The graphite dispersion and the resin emulsion were blended together, and the dispersion diluted to 500 parts by weight. When this material was sprayed on steel alloy billets which were at a temperature of 1100° F a dense, adherent coating deposited instantly. Even at temperatures of 1400° F it was possible to form a dense, adherent coating on the surface of such billets. There was thus provided on the hot billets a lubricating coating which protected the surface of the steel from oxidation.

EXAMPLE 6

A dispersion of fine molybdenum disulfide, substantially all finer than 5 microns, was prepared by grinding together in a pebble mill 30 parts of molybdenum disulfide powder, 8 parts of potassium alkyl naphthalene sulfonate dispersant, 13 parts of triammonium phosphate for a period long enough to achieve dispersion of the molydenum disulfide. Fifty parts of monoaluminum phosphate colloidal dispersion in 50 parts of water were added and the milling continued another hour. The dispersion was diluted with water to 330 parts by weight. The molybdenum disulfide dispersion in the presence of the strongly acid monoaluminum phosphate showed little tendency to flocculate, and showed no significant sediment or separation on standing for seven days. When sprayed on steel substrates heated to 500° F at a thickness of 0.005 in., the coating was strongly adherent and hard. Exposure of the coated steel at 800° for 8 hours produced no oxidation or scale through the coating.

EXAMPLE 7

An emulsion was prepared by dissolving 25 parts of petroleum hydrocarbon coating resin in 47 parts of mineral spirits (petroleum naphtha), and mixing in 27 parts of nonyl phenyl polyethoxy ethanol. Twenty-six parts of warm water was added and stirred 10 minutes. Cold water was then stirred in to form the emulsion by inversion and the emulsion was diluted with water to 300 parts by weight. This emulsion was blended with the molybdenum disulfide dispersion of Example 6 at a ratio of 1:1 by weight to produce dispersions which remained fluid and of smooth consistency for several days. Coatings sprayed on steel heated to 500° F were dense and adherent but smoother, softer, and more lubricious than those formed in Example 6 without the resin modifier. They could be burnished to a high gloss by rubbing with steel wool. This material was applied to other specimens heated to 300° F by brushing, to give coatings of good adhesion and uniformity before subsequent baking. It was possible to increase the degree of softening of the coatings and to increase lubricity by increasing the ratio of resin emulsion blended with the molybdenum disulfide dispersion.

EXAMPLE 8

A dispersion of boron nitride, substantially all below 20 microns, was prepared by grinding together in a pebble mill 21 parts of boron nitride powder, 11 parts of ammonium lignin sulfonate, 5.5 parts of sodium dihydrogen phosphate and 80 parts water. When complete dispersion was obtained, 37 parts of colloidal monoaluminum phosphate was added as a dispersion in 37 parts of water and grinding continued for 2 hours. An emulsion of petroleum hydrocarbon resin was prepared by the technique of Example 7, using 18 parts of resin and 7 parts of iso-octyl phenyl polyethoxy ethanol in water to a total of 100 parts. The emulsion was blended with the boron nitride dispersion and the whole diluted with water to 1250 parts. The stable product was sprayed on steel billets heated to 1400° F to form a coating 0.002 in. thick. The coating was dense, adherent and lubricious; and was unchanged by exposure at 1200° F for 4 hours.

EXAMPLE 9

A dispersion of fine electric furnace graphite, substantially all finer than 5 microns, was prepared by grinding together in a pebble mill 28 parts of graphite powder, 7.1 parts of sodium salt of sulfonated naphthalene formaldehyde condensate, 14.6 parts of sodium tetraborate, 100 parts water. After sufficient grinding time to achieve dispersion of the solid, 50 parts monoaluminum phosphate dispersion in 50 parts of water were added, and grinding continued 2 hours. Water was added to the product to make a total of 1250 parts. Test rings for the LFW-1 testing machine were heated to 500° F and sprayed with this product to give a coating thickness of 0.005 in. The rings were then baked one hour at 600° F. Three of these rings were run on the LFW-1 testing machine under 30 pound load for 10,000 revolutions, at which time the friction coefficient was 0.053. Three other coated rings were fired in an oven at 1200° F for 1 hour, cooled, and subjected to the same test on the LFW-1 machine. After 10,000 cycles the friction coefficient was again 0.053.

EXAMPLE 10

A dispersion of fine electric furnace graphite, substantially all finer than 5 microns, was prepared by grinding together in a pebble mill 19 parts of graphite, 4.7 parts of sodium salt of sulfonated naphthalene formaldehyde condensate, 10 parts of sodium dihydrogen phosphate, and 75 parts water. After sufficient time to achieve dispersion of the solid, 33 parts colloidal monoaluminum phosphate as a colloidal dispersion in 33 parts of water were added and grinding continued about 2 hours. A blend of 26 parts of methoxy melamine resin and 9 parts of iso-octyl phenyl polyethoxy ethanol was warmed to 100° F and mixed until clear. Thirty parts of cool water was added with stirring until uniform. The graphite dispersion and the resin emulsion were blended and diluted to 800 parts total weight. The product was sprayed on LFW-1 test rings as in Example 9 to a thickness of 0.5 mils and the coated rings were baked at 600° F for 1 hour. Two rings run 10,000 cycles on the LFW test machine showed average friction coefficient at the end of that period of 0.047. Another two coated rings were heated at 1200° F in air for 5 hours. They were then run on the LFW-1 test machine for 10,000 cycles under the same conditions, and the friction coefficient was found to be unchanged.

EXAMPLE 11

A dispersion of powdered talc substantially all finer than 15 microns, was prepared by grinding together in a pebble mill 36 parts of powdered talc, 8 parts of sodium salt of a partial lignin sulfonate, 18 parts of a sodium dihydrogen phosphate, and 100 parts of water. After grinding sufficient to achieve dispersion of the solid, 27 parts of colloidal monoaluminum phosphate as a colloidal dispersion in 27 parts of water were added, and grinding continued about two hours. A blend of 7.5 parts of methoxy melamine resin and 2.5 parts of nonyl phenyl polyethoxy ethanol was warmed to 100° F and mixed until clear. Ten parts of cold water were added with stirring until uniform. The talc dispersion and the resin emulsion were blended and diluted to 660 parts total weight. A steel battery grid mold was heated to 500° F and the above talc dispersion was sprayed on to form a coating about 0.003 in. thick. The mold was baked 1 hour at 600° F and then lightly polished with steel wool to give a satiny smooth surface. The closed mold was heated to 600° F and molten aluminum at 1340° F was poured into the mold. The castings filled the mold completely, showed excellent detail and were not contaminated with the mold coating. No deterioration of the coating occurred on repeated castings through 10 cycles.

EXAMPLE 12

A mica dispersion in the size range 1 to 15 microns was prepared by grinding together in a pebble mill 42 parts of mica powder, 7 parts of sodium salt of sulfonated naphthalene formaldehyde condensate, 15 parts of ammonium dihydrogen phosphate, and 100 parts water. After the solid was dispersed, 26 parts of colloidal monoaluminum phosphate as a colloidal dispersion in 26 parts of water was stirred into the mica dispersion. An emulsion of G. E. silicone resin SR-120 was prepared by blending 7 parts of the resin with 3 parts of iso-octyl phenyl polyethoxy ethanol and stirring in 10 parts of water. The resin emulsion was blended with the mica dispersion and the blend diluted to 500 parts. Small steel billets were sand-blasted and preheated to 200° F. These were dipped in the above mica dispersion and air dried to leave a film about 0.002 inch thick. The billets were then heated by induction. After 30 minutes at 1600° F, no oxidation of the steel was observed. Other coated billets heated 10 minutes at 2000° F showed no significant oxidation or scale formation.

EXAMPLE 13

A dispersion containing glass frit and vermiculite, both substantially all finer than 15 microns, was prepared by grinding together in a pebble mill 15 parts of powdered glass frit, 26 parts of vermiculite powder, 9 parts of sodium salt of sulfonated naphthalene formaldehyde condensate, 10 parts of diammonium hydrogen phosphate and 100 parts water. A dispersion of aluminum phosphate was prepared by heating together at 250° F for 5 minutes 6 parts aluminum oxide powder and 34 parts of syrupy phosphoric acid. The slurry was then blended with 50 parts of water and added to the dispersion in the pebble mill, followed by 2 hours additional grinding. The mill was unloaded and water added to bring the total amount to 550 parts. This composition was applied to steel billets which had been sand-blasted and heated to 250° F by swabbing it onto the surface. After thorough drying, one billet was heated one hour at 1600° F and another for 20 minutes at 2000° F. The steel was protected against oxidation and no scale was formed in either case.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A stable dispersion coating composition, suitable for use in forming a coating on surfaces which contact hot glass in the manufacture of glassware,
 comprising in weight percent of total solids,
  a. about 5% to about 45% of finely divided pigment from at least one of the group consisting of lubricating pigments, clay pigments, and refractory pigments,
  b. about 1% to about 15% of a pigment dispersing agent to provide for proper dispersion of the pigment in the composition, said agent being selected from the group consisting of anionic surfactants of the non-foaming type,
  c. about 20% to about 60% of aluminum phosphate as a binder material,
  about 3% to about 20% of a stabilizing buffering agent to maintain a stable dispersion in the presence of the aluminum phosphate, selected from at least one of the group consisting of the ammonium and the alkali metal monobasic, dibasic, or tribasic salts of phosphoric, phosphorus, boric, phthalic, tartaric, and acetic acids, e. about 1% to about 50% of an organic water dispersible resinous film-modifying agent for providing a fine smooth coating,
  f. about ½% to about 20% of a nonionic emulsifying agent for said film modifying agent.

and total solids being between about 2% to about 50% by weight of the composition, and the balance being an aqueous solvent carrier.

2. The invention of claim 1 wherein,
part (a) is present from about 13% to about 20%,
part (b) is present from about 3% to about 6%,
part (c) is present from about 30% to aout 45%,
part (d) is present from about 7% to about 11%,
part (e) is present from about 15% to about 38%, and
part (f) is present from about 3% to about 12%
and the total solids are between about 6% and 40%.

3. The invention of claim 1 wherein,
part (a) is present from about 16% to about 18%,
part (b) is present from about 4% to about 5%,
part (c) is present from about 38% to aout 42%,
part (d) is present from about 9% to about 10%,
part (e) is present from about 22% to about 26%, and
part (f) is present from about 4% to about 6%
and the total solids are between about 8% and 35%.

4. The invention of claim 1 wherein, said water dispersible film modifying agent is one or more of the resins selected from the group consisting of emulsifiable, acid stable, melamine resins, hydrocarbon resins, silicone resins, epoxy resins, acrylic resins, and polyester resins.

5. The invention of claim 1 wherein, said pigment has a particle size wherein substantially all particles are under about 20 microns in size.

6. The invention of claim 1 wherein, said coating can satisfactorily be applied to a substrate at a surface temperature from about 220° up to as high as about 1400° F. at a coating thickness from about 1 to about 10 mils and higher.

7. The invention of claim 1 wherein, said water dispersible resin is one or more of the resins selected from the group consisting of emulsifiable, acid stable, hydrocarbon resins, silicone resins, epoxy resins, acrylic resins, and polyester resins.

8. The stable dispersion coating composition of claim 1 wherein said finely divided pigment is selected from at least one of the group consisting of graphite, molybdenum disulfide, vermiculite, talc, glass, calcium fluoride, iron oxide, and boron nitride.

9. The invention of claim 8 wherein, said pigment has a particle size wherein substantially all particles are under about 20 microns in size.

* * * * *

UNITED STATES PATENT AND TRADEMARK OFFICE
CERTIFICATE OF CORRECTION

PATENT NO. : 4,003,867
DATED : January 18, 1977
INVENTOR(S) : Arthur W. Cooper and Thomas E. Rupp It is certified that error appears in the above-identified patent and that said Letters Patent are hereby corrected as shown below:

Column 1, line 8, the phrase "This invention relates" should read as -- This invention broadly relates --;

Column 3, line 9, the phrase "of the invention" should read as -- the invention --;

Column 7, line 46, the word "stirring" should read -- stirred --;

Column 9, line 43, the word "sufficient" should read as -- sufficient time --;

Column 11, line 23, the word "aout" should be --about--;

Column 12, line 15, the word "resin" should read as -- resinous film-modifying agent --.

Signed and Sealed this

Eleventh Day of April 1978

[SEAL]

Attest:

RUTH C. MASON
Attesting Officer

LUTRELLE F. PARKER
Acting Commissioner of Patents and Trademarks